United States Patent
Hu et al.

(10) Patent No.: US 7,317,963 B2
(45) Date of Patent: Jan. 8, 2008

(54) METHOD AND SYSTEM FOR GENERATING TRIMLINES FOR STAMPING PROCESSES

(75) Inventors: Weigang Hu, Westland, MI (US); Gerald McLaughlin, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 114 days.

(21) Appl. No.: 11/410,809

(22) Filed: Apr. 25, 2006

(65) Prior Publication Data
US 2007/0250205 A1    Oct. 25, 2007

(51) Int. Cl.
G06F 19/00 (2006.01)
(52) U.S. Cl. ..................................... 700/165
(58) Field of Classification Search ............... 700/165, 700/167, 174, 176, 182
See application file for complete search history.

(56) References Cited

U.S. PATENT DOCUMENTS

| | | | |
|---|---|---|---|
| 6,704,693 B1* | 3/2004 | Fan et al. | 703/1 |
| 6,785,640 B1* | 8/2004 | Lu et al. | 703/7 |
| 2003/0167097 A1 | 9/2003 | Hillmann et al. | |
| 2003/0182005 A1 | 9/2003 | Chu et al. | |
| 2006/0293776 A1* | 12/2006 | Hillman et al. | 700/98 |
| 2007/0038422 A1* | 2/2007 | Wang et al. | 703/8 |

OTHER PUBLICATIONS

Miller et al.; "The Pratical Use of Simulation in the Sheet Metal Forming Industry"; 2001; Wilde & Partners Ltd.*
Gould, Lawrence; "GM's Metal Forming Fabricating Division Stamps its Approval of CAD/CAM"; Automotive Design; Gardner Publications, Inc.*
Swann, Terry; "Virtual Tryout Simulation Software Simplifies Progressive Die Troubleshooting"; Aug. 14, 2003, Stamping Journal.*
Altan et al.; "Design Rules for Forming Aluminum Stampings"; Feb. 2, 2002; Fabricator.com.*
Steininger, Ing.; "Forming Simulation in the Vehicle Development Process"; Feb. 1, 1998; The Fabricator.*

* cited by examiner

Primary Examiner—Leo Picard
Assistant Examiner—Chad Rapp
(74) Attorney, Agent, or Firm—Raymond L. Coppiellie; Brooks Kushman P.C.

(57) ABSTRACT

According to one embodiment of the present invention, an electronic method for generating a trimline for trimming sheet metal to be stamped to obtain a stamped part is disclosed. The method includes providing a CAD part file representing a part that can be stamped from a sheet metal material; receiving a selection of a part surface on the part to be stamped and a line on the surface; receiving an input of a sheet metal thickness for the sheet metal material; and generating a trimline based on the CAD part file, the line on the surface, and the sheet metal thickness.

20 Claims, 7 Drawing Sheets

METHOD AND SYSTEM FOR GENERATING TRIMLINES FOR STAMPING PROCESSES

BACKGROUND OF THE INVENTION

1. Field of the Invention

One aspect of the present invention generally relates to a method and system for generating trimlines for stamping processes.

2. Background Art

Since the introduction of computer aided design (CAD) and computer aided manufacturing (CAM) tools into tool shops, operators and engineers have been laying out trimlines by manually cutting sections through the CAD representation of sheet metal parts, which is a laborious and time-consuming process. On average, 10-15 hours are devoted to manually completing an accurate trimline layout.

The accuracy of the trimline layout can vary widely depending on the level of experience of the operator or engineer. The operator or engineer must typically consider complex sheet metal bending principles while laying out the manual trimlines, and make assumptions to simplify the principles based on experience so that the principles can be applied to the manual process.

CAD system developers have failed to develop effective tools to assist tool shops in decreasing the completion time for trimline layouts due, in part, to the complexity of the sheet metal bending principles. A tool exists with limited functionality directed at the development of reference trimlines. This tool does not account for metal thickness, instead using the geometric surface to generate the reference trimline, which is not suitable for use in production. Instead, the reference trimline can be used as a rough guide. However, the manual process is still needed to produce an accurate trimline for production purposes.

Moreover, the geometry of a trimline layout is needed to generate the NC cutter path to machine the trim steels that is inserted into opposing dies. It is often difficult to predict the behavior of the part sheet metal in subsequent die operations, thereby generating inaccurate trimlines. In such cases, the trim steels must be recut during die tryout to achieve product intent.

The manual process is not only relatively time consuming, it can produce inconsistent results based on the experience of the operator or engineer.

In light of the foregoing, what is needed is a computer-implemented method and system for generating a trimline layout for a stamped part. What is also needed is a computer-implemented method and system for generating consistently accurate trimline layouts in a relatively short amount of time.

SUMMARY OF THE INVENTION

One aspect of the present invention is a method and system for generating a trimline layout for a stamped part. Another aspect of the present invention is a computer-implemented method and system for generating consistently accurate trimline layouts in a relatively short amount of time. In at least one embodiment, the relatively short period of time can be in range of 10 minutes or less, whereas the manual process can take from 10 to 15 hours.

According to one embodiment of the present invention, an electronic method for generating a trimline for trimming sheet metal to be stamped to obtain a stamped part is disclosed. The method includes providing a CAD part file representing a part that can be stamped from a sheet metal material; receiving a selection of a part surface on the part to be stamped and a line on the surface; receiving an input of a sheet metal thickness for the sheet metal material; and generating a trimline based on the CAD part file, the line on the surface, and the sheet metal thickness.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings which:

DETAILED DESCRIPTION OF EMBODIMENTS OF THE PRESENT INVENTION

Figure 1:
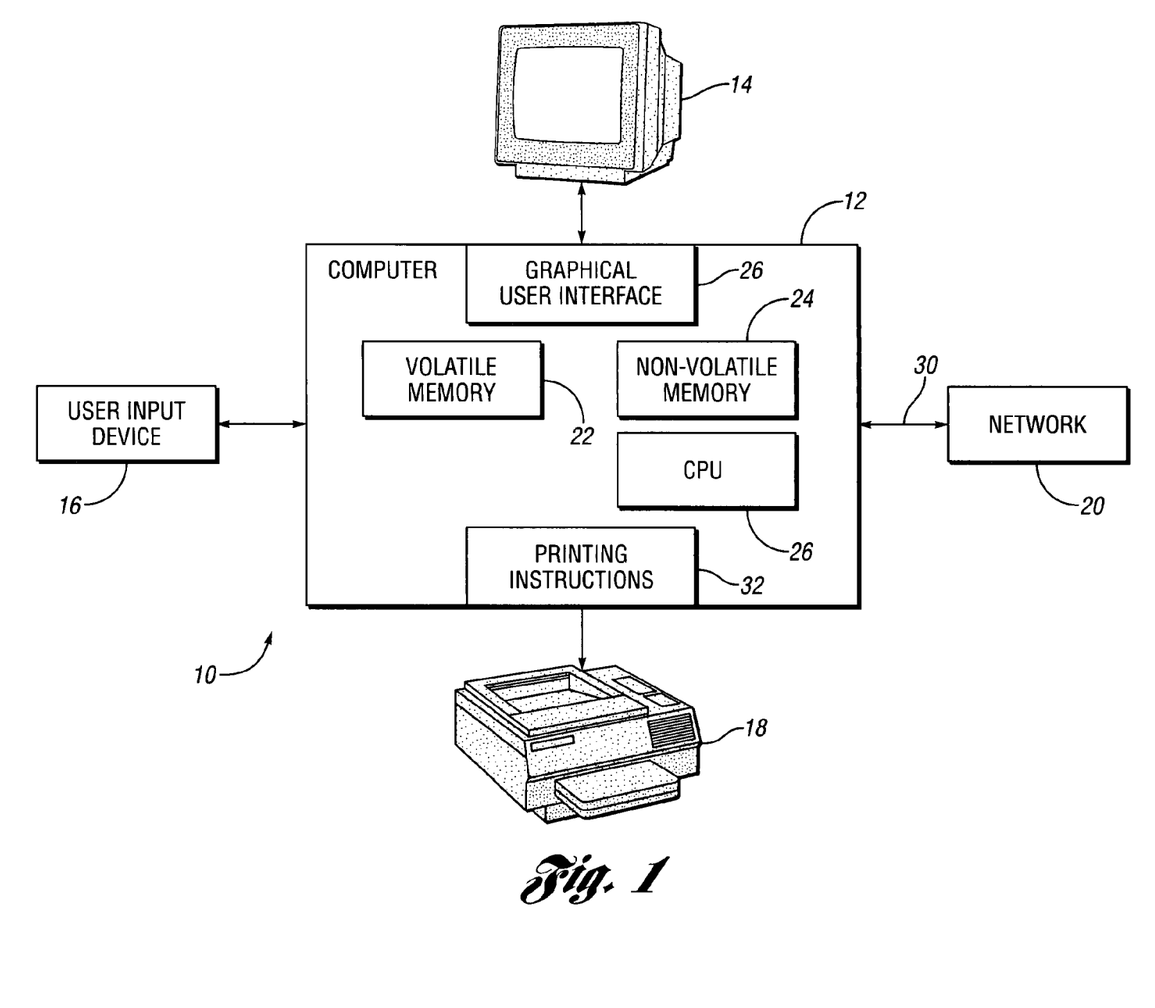
FIG. 1 depicts an environment suitable for implementing one or more embodiments of the present invention.

FIG. 1 depicts an environment, i.e. computer system 10, suitable for implementing one or more embodiments of the present invention. Computer system 10 includes computer 12, display 14, user input device 16, printer 18 and network 20.

Computer 12 includes volatile memory 22, non-volatile memory 24 and central processing unit (CPU) 26. Non-limiting examples of non-volatile memory include hard drives, floppy drives, CD and DVD drives, and flash memory, whether internal, external, or removable. A database can reside in non-volatile memory 24. The database may also reside on a separate computer, e.g. a server computer, accessible through the network 20. Volatile memory 22 and/or non-volatile memory 24 can be configured to store machine instructions. In at least one embodiment, a computer aided design (CAD) and/or computer aided manufacturing (CAM) system can be loaded into non-volatile memory 24. A non-limiting example of a CAD/CAM system is CATIA V5, available from Dassault Systems of France. CPU 26 can be configured to execute machine instructions to implement functions of the present invention, for example, developing trimlines for stamping processes. It should be appreciated that the CAD/CAM system can be used to implement one or more functions of the present invention. For example, software code can be written in C++ or other suitable programming language and compiled. The compiled executable code can be integrated into the CAD/CAM system, e.g. CATIA V5.

Users can utilize display 14 to input, view, edit, and modify data relating trimline generation. Non-limiting examples of users of computer 12 include die process engineers, trim process engineers, and tool shop operators. A non-limiting example of display 14 is a color display, e.g. a liquid crystal display (LCD) monitor or cathode ray tube (CRT) monitor. A graphical user interface 28 can be generated by computer 12 and displayed on display 14 to facilitate the input of data. It should be appreciated that display 14 can also graphically display layouts of trimlines as developed by methods and systems of the present invention.

The user input device 16 can be utilized by a user to input instructions to be received by computer 12. The user input device 16 can be a keyboard having a number of input keys, a mouse having one or more mouse buttons, a touchpad or a trackball or combinations thereof. In certain embodiments, the mouse has a left mouse button and a right mouse button. It will be appreciated that the display 14 and user input device 16 can be the same device, for example, a touch-sensitive screen.

Computer 12 can be configured to be interconnected to network 20, through two-way communication line 30, for example, a local area network (LAN) or wide area network (WAN), through a variety of interfaces, including, but not limited to dial-in connections, cable modems, high-speed lines, and hybrids thereof. Firewalls can be connected in the communication path to protect certain parts of the network from hostile and/or unauthorized use.

Computer 12 can support TCP/IP protocol, which has input and access capabilities via two-way communication line 30. The communication lines can be an intranet-adaptable communication line, for example, a dedicated line, a satellite link, an Ethernet link, a public telephone network, a private telephone network, and hybrids thereof. The communication lines can also be intranet-adaptable. Examples of suitable communication lines include, but are not limited to, public telephone networks, public cable networks, and hybrids thereof.

Computer 12 can be configured to generate printing instructions 32 for transmission to printer 18. Printer 18 can be utilized to print CAD/CAM drawings of trimline layouts.

Figure 2:
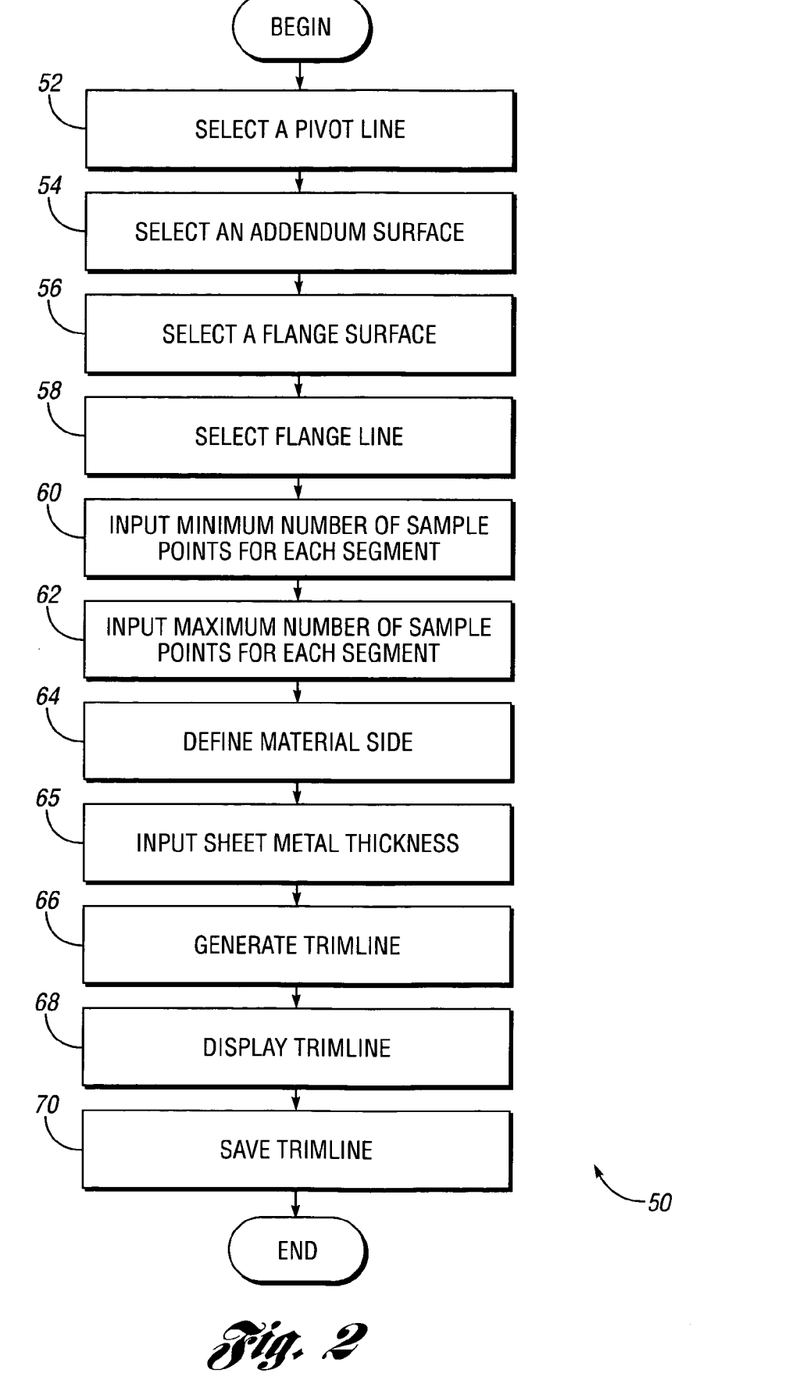
FIG. 2 is a flowchart of a method for developing trimlines with an addendum surface for a part according to one embodiment of the present invention.
Figure 3A:
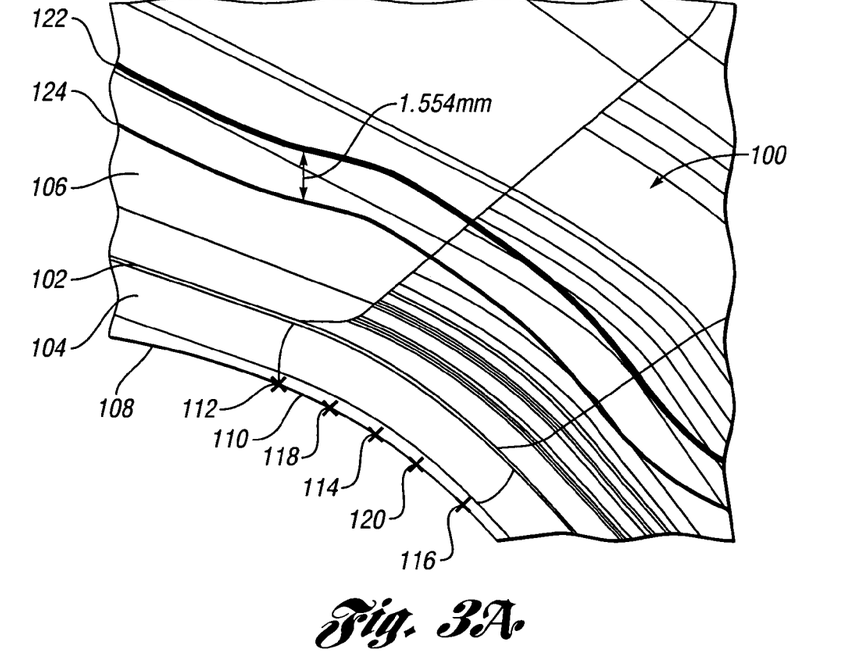
FIGS. 3a and 3b are a graphical representation of a part depicting the results of the method as described in FIG. 2.
Figure 3B:
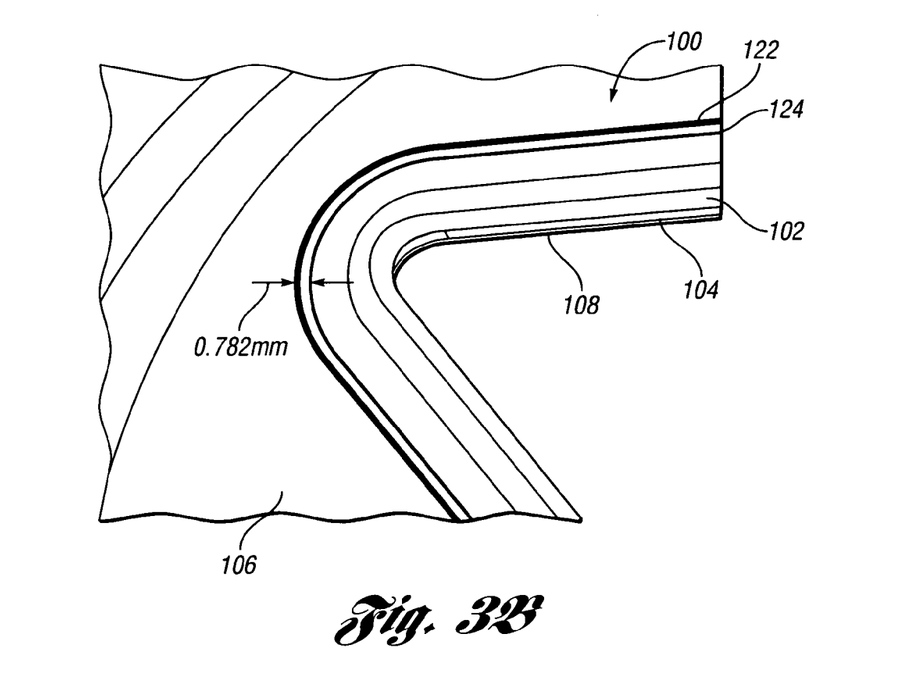

FIGS. 2, 3a and 3b are now considered together. FIG. 2 is a flowchart 50 of a method for generating trimlines with an addendum surface for a part according to one embodiment of the present invention. FIGS. 3a and 3b is a graphical representation of different portions of a part 100 depicting the results of the method as described in FIG. 2. The graphical representation can be generated by a CAD/CAM system based on a CAD/CAM data file. The graphical representation can be displayed on display 14 through a GUI generated by the CAD/CAM system.

In block 52, a pivot line 102 is selected on the flange surface 104 of a part 100. In at least one embodiment, an outer edge or outer boundary of a flange surface is suitable for selection as a pivot line. It should be appreciated that the pivot line selection, as well as the other geometry selections described herein, can be made by selecting the appropriate geometry on the graphical representation of the part as displayed through a GUI generated by the CAD/CAM system.

In block 54, an addendum surface 106 is selected. In at least one embodiment, the pivot line cannot be coincident with an internal curve of the addendum surface. In such case, the pivot line can split the addendum surface so that the trimlines can be generated.

In block 56, the flange surface 104 is selected. A flange surface can be any surface that contains the pivot line as an edge.

In block 58, a flange line is selected. In at least one embodiment, there are four types of lines on a flange surface that can be selected as a flange line: an edge of the flange surface, a boundary of a flange surface, an inner curve on a flange surface, and an inner hole on a flange surface. According to FIGS. 3a and 3b, flange lines 108 is selected, which is the edge of flange surface 104.

In block 60, a minimum number of sample points are input for each segment curve of the flange line. In at least one embodiment, the minimum number of sample points is an integer that is greater than zero. According to FIG. 3a, the flange line 108 includes segment curve 110, which includes three sample points 112, 114 and 116 as the minimum number of sample points. It should be appreciated that the minimum number can be varied based on the tradeoff the user strikes between computing time and accuracy. By increasing the minimum number, the accuracy can increase at the cost of additional computing time. It should be appreciated that this data, as well as the other data input as described herein, can be input by entering data into a graphical window generated by the CAD/CAM system and displayed on display 14.

In block 62, a maximum number of sample points are input for each segment curve of the flange line. According to FIG. 3a, segment curve 110 includes five sample points 112, 114, 116, 118 and 120 as the maximum number of sample points. In at least one embodiment, the maximum number of sample points is an integer and is greater than the minimum number of sample points. It should be appreciated that the maximum number can be varied based on the tradeoff the user strikes between computing time and accuracy. By increasing the maximum number, the accuracy can increase at the cost of additional computing time.

In at least one embodiment, the actual number of sample points distributed for each segment curve of the flange line is the least number within the range between the minimum and maximum numbers in which the chordal deviation of any two sample points for is less than or equal to 0.1 millimeters, and in some embodiments, less than 0.5 millimeters. The actual number of sample points is used in the calculations to determine the trimline layout.

Figure 4A:
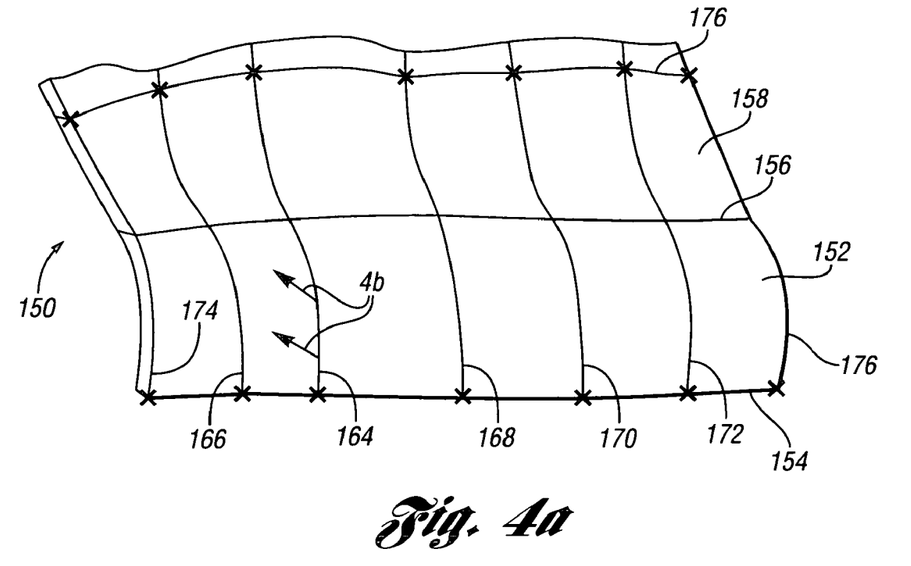
FIG. 4a depicts a pictorial, perspective view of a part 150 according to one embodiment of the present invention.
Figure 4B:
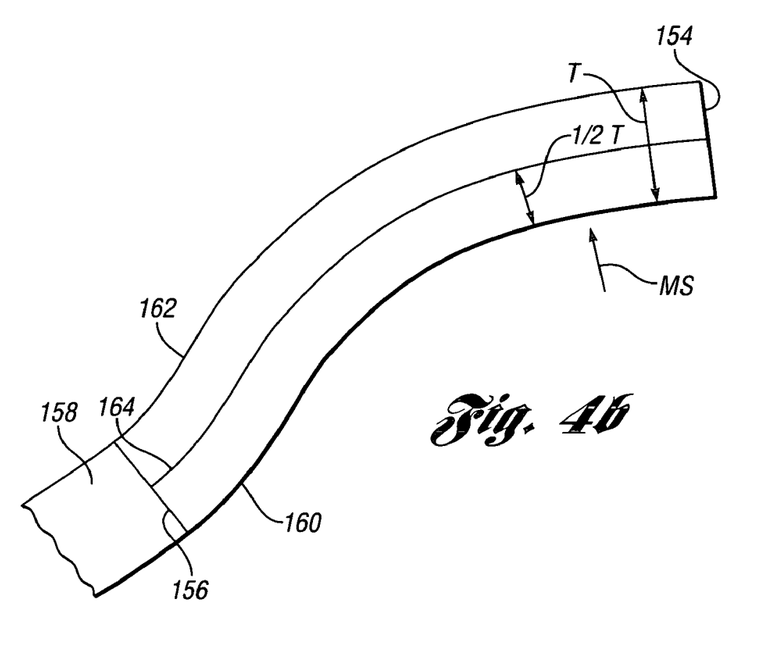
FIG. 4b depicts a cross-sectional view of FIG. 4a taken along the line 4b-4b.

In block 64, the material side is selected. In block 65, the sheet metal thickness of the flange surface is input. According to FIG. 4, the metal thickness is shown as dimension T and the material side is defined by vector MS.

In block 66, a trimline is generated based on the input and selections of blocks 52 through 65. In at least one embodiment, a sheet metal bending model is utilized to generate the trimlines. Reference is now made to FIGS. 4a and 4b as background for describing the sheet metal bending model. FIG. 4a depicts a pictorial, perspective view of a part 150 according to one embodiment of the present invention. FIG. 4b depicts a cross-sectional view of FIG. 4a taken along the line 4b-4b. Part 150 includes flange 152, flange line 154, pivot line 156 and addendum surface 158. Cross section of flange 152 at line 4b-4b includes geometric surface 160.

In one embodiment, the sheet metal bending model includes determining a neutral layer position. In at least one embodiment, the neutral layer position is defined as a position between the geometric surface 160 and the opposing surface 162 of the part. In order to determine the neutral layer position, the material side and the material thickness are considered. In FIG. 4b, the material side is defined by vector MS and the material thickness extends the dimension T through in the direction of vector MS. In at least one embodiment, the neutral layer position is ½ of the material thickness T, although it should be understood that other positions may be used, e.g. ⅓ T.

In at least one embodiment, the sheet metal bending model also determines the offset from the geometric surface based on the sheet metal material. In at least one embodiment, e.g. steel and aluminum, the offset can be ½ T, as reflected in FIG. 4b. In other embodiments, the material offset can be ⅓ T or ⅔ T.

The offset length and/or the neutral layer positions can be then used to determine the length of the neutral line 164 at cross-section line 4b-4b of FIG. 4a. Moreover, the length of other neutral lines along the length of the flange 152 can be determined. Each neutral line 164 through 174 is projected onto addendum surface 158 and the end points of each projection are connected in the form of a spline to form trimline 176. It should be appreciated that the number and spacing of each neutral line can be determined by the number of segment curves and the actual number of sample points per segment curve.

It should be appreciated that a trimline can comprise a number of splines. In such instances, the splines can be optionally smoothed by linking the adjacent endpoints of a spline pair by tangency. In at least one embodiment, the generated trimlines can be forced onto the addendum surface. This operation incrementally increases the accuracy of the trimline, although it may add to computing calculation time.

In block 68, the generated trimline is displayed. According to FIG. 4a, trimline 176 can be displayed. According to FIGS. 3a and 3b, trimline 122 can be displayed. Moreover, FIGS. 3a and 3b include trimline 124, which was generated by using the geometric surface, instead of the neutral line determined by the sheet metal bending model. Trimline 124 can only be used as a "reference", whereas trimline 122 can be used in production. In the portion of the part 100 shown in FIG. 3a, the difference between the reference trimline 124 and the accurate trimline 122 is 1.554 mm. In the portion of the part 100 shown in FIG. 3b, the difference between the reference trimline 124 and the accurate trimline 122 is 0.782 mm.

In block 70, the generated trimline can be saved in the CAD/CAM data file residing in non-volatile memory 24. Moreover, the input data and selections can also be saved to a file residing on non-volatile memory 24.

In at least one embodiment, the present invention includes the ability to detect and correct bad surface quality on a flange surface and/or an addendum or class one surface. Relatively small gaps can be fixed by connected the end points of the gap with a line. Relatively small overlaps can be fixed eliminating the overlap segment.

Figure 5:
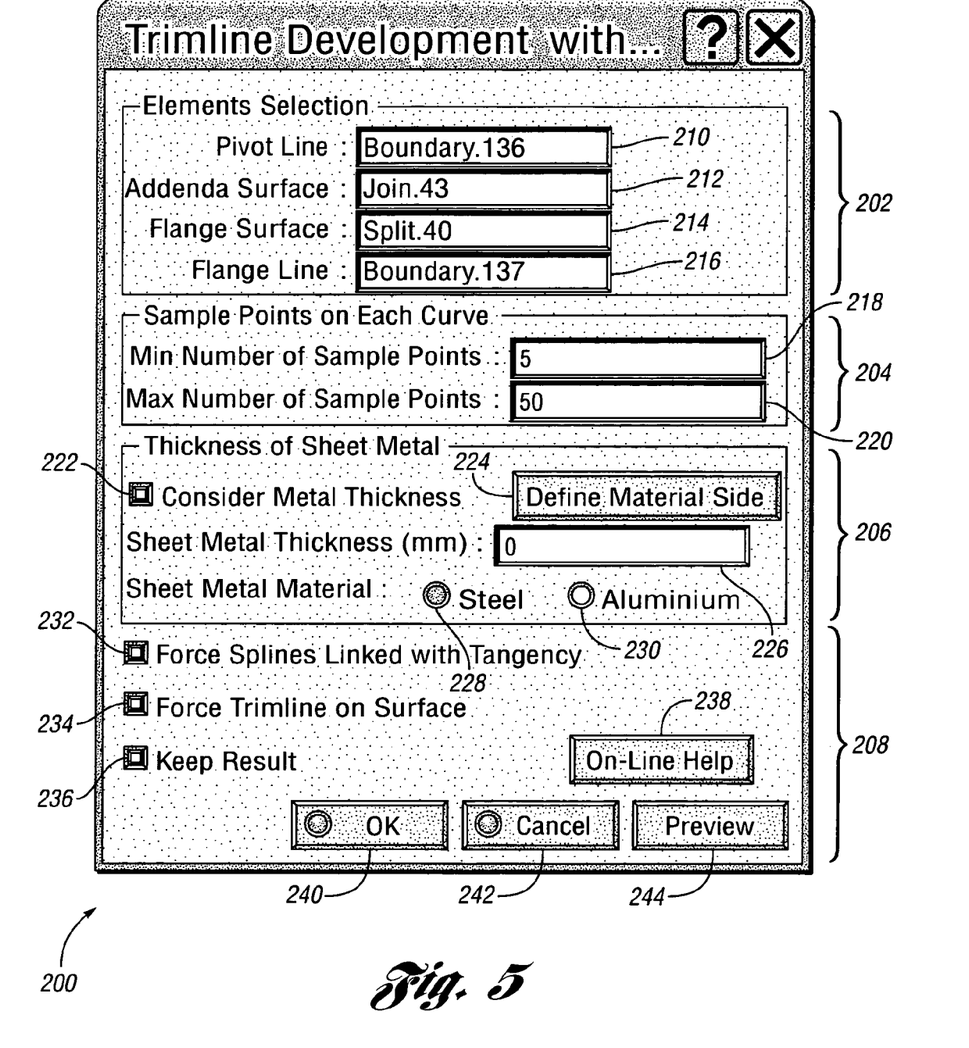
FIG. 5 is a graphical window for selecting geometry and inputting data for use in generating trimlines with an addendum surface for a part in accordance with one embodiment of the present invention.

FIG. 5 is a graphical window 200 for selecting geometry and inputting data for use in generating trimlines with an addendum surface for a part. Graphical window 200 includes elements selection area 202, sample points on each segment curve area 204, thickness of sheet metal area 206, and click boxes and buttons area 208. Elements selection area 202 includes pivot line field 210, addenda surface field 212, flange surface 214 and flange line 216. In at least one embodiment, each of these elements can be selected by clicking on the appropriate geometry on the graphical representation of the part displayed through a GUI on display 14. The assigned name for the selected geometry then automatically appears in the appropriate field, e.g. "Boundary.136", "Joint.43", "Split.40", and "Boundary.137". Sample points on each segment curve area 204 includes min number of sample points field 218 and max number of sample points field 220. The user can directly enter the values for these fields.

The thickness of sheet metal area 206 includes consider metal thickness toggle box 222 for toggling the option between on (checked) and off (unchecked) settings. If the box 222 is checked, the user can click on define material side click box 224 to define the material side through the graphical representation of the part. Moreover, the user can enter the sheet metal thickness in millimeters in field 226. The user can select the sheet metal material by toggling between the steel and aluminum radio buttons 228 and 230.

The click boxes and buttons area 208 includes force splines linked with tangency toggle box 232 for toggling the option between on (checked) and off (unchecked) settings. Area 208 also includes force trimline on surface toggle box 234 for toggling the option between on (checked) and off (unchecked) settings and keep result toggle box 236 for toggling the option between on (checked) and off (unchecked) settings. Area 208 also includes on-line help button 238 for selecting on-line help menus. Area 208 includes OK button 240 for determining the trimline, displaying the results and closing window 200. Area 208 also includes cancel button 242 for undoing any trimline determination conducted and closing window 250. Area 250 also includes preview button 244 for determining the trimline, displaying the results and keeping window 200 active and open.

Figure 6:
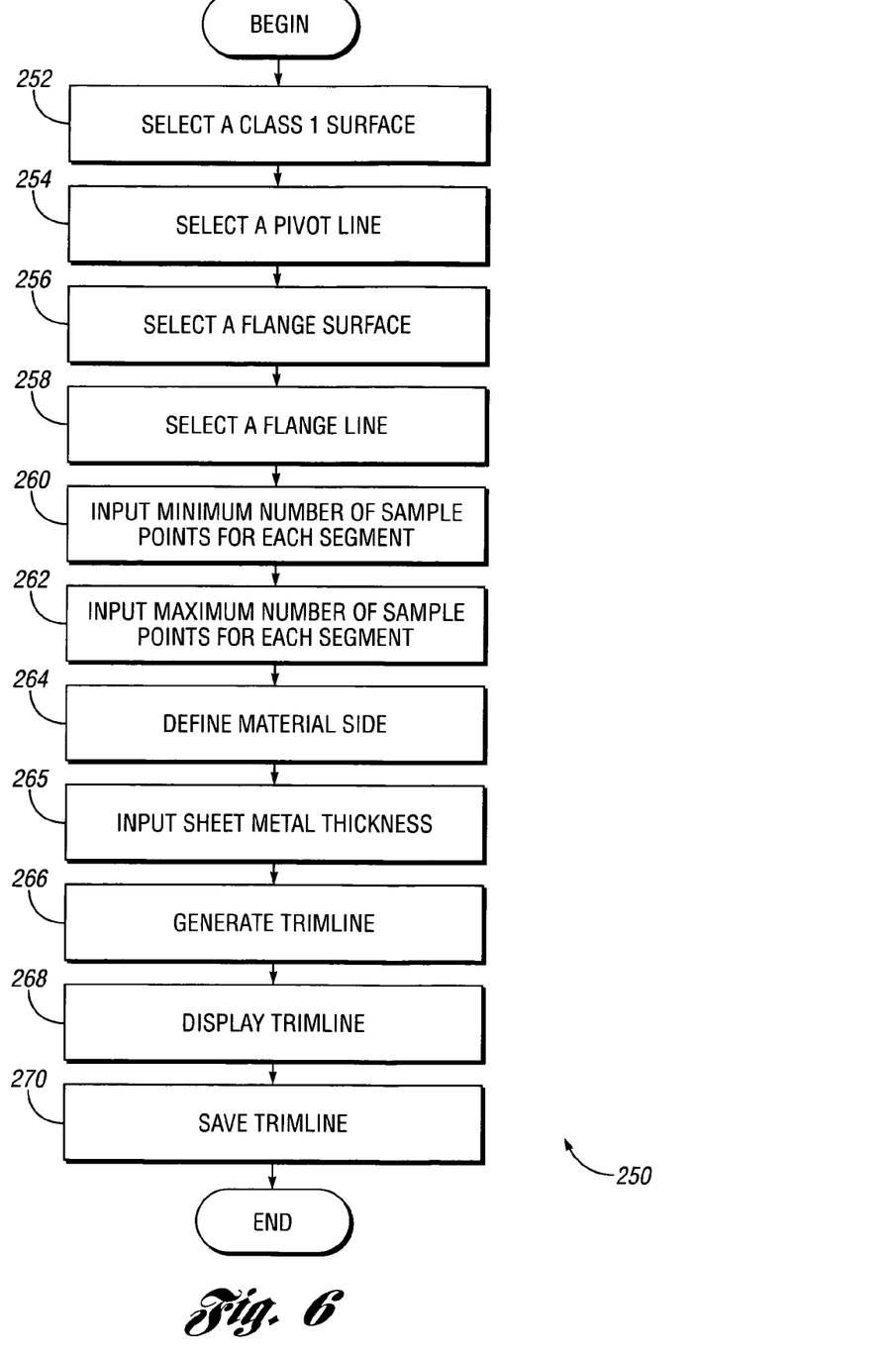
FIG. 6 is a flowchart of a method for developing trimlines without an addendum surface for a part according to one embodiment of the present invention.
Figure 7:
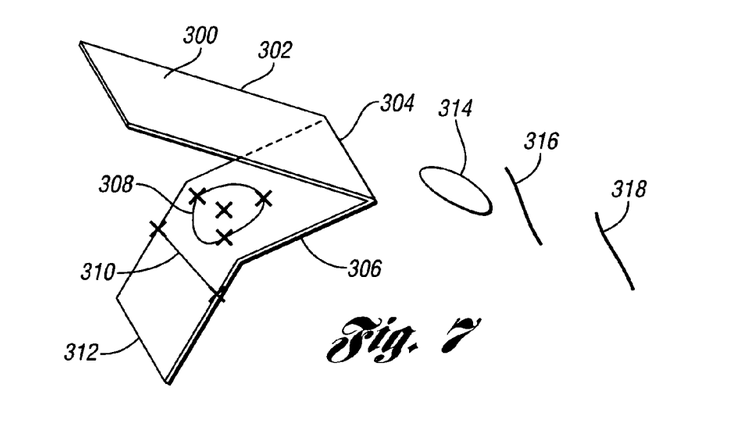
FIG. 7 is a graphical representation of the results of the method as described in FIG. 6.

FIGS. 6 and 7 are now considered together. FIG. 6 is a flowchart 250 of a method for generating trimlines without an addendum surface for a part according to one embodiment of the present invention. FIG. 7 is a graphical representation of a part 300 depicting the results of the method as described in FIG. 6. The graphical representation can be generated by a CAD/CAM system based on a CAD/CAM data file. The graphical representation can be displayed on display 14 through a GUI generated by the CAD/CAM system.

In block 252, a class one surface 302 is selected on a part 300. It should be appreciated that the class one surface selection, as well as the other selections described herein, can be made by selecting the appropriate geometry on the graphical representation of the part as displayed through a GUI generated by the CAD/CAM system.

In block 254, a pivot line 304 is selected. In at least one embodiment, an outer edge or outer boundary of a class one surface is suitable for selection as a pivot line.

In block 256, a flange surface 306 is selected. A flange surface can be any surface that contains the flange line.

In block 258, a flange line is selected. In at least one embodiment, there are four types of curves on a flange surfaces that can be selected as a flange line: an edge of the flange surface, a boundary of a flange surface, an inner curve on a flange surface, and an inner hole on a flange surface. According to FIG. 7, three flange lines 308, 310 and 312 are selected. Flange line 308 is an inner hole on flange surface 306. Flange line 310 is an inner curve on flange surface 306. Flange line 312 is an edge of flange surface 306.

In block 260, a minimum number of sample points for each segment curve on each flange line are input. In at least one embodiment, this step can be carried out pursuant to the instructions described above for block 60 of FIG. 2. It should be appreciated that this data, as well as the other data input as described herein, can be input by entering data into a graphical window generated by the CAD/CAM system and displayed on display 14.

In block 262, a maximum number of sample points for each segment curve on each flange line are input. In at least one embodiment, this step can be carried out pursuant to the instructions described above for block 62 of FIG. 2.

In at least one embodiment, the actual number of sample points distributed for each segment curve of the flange line is the least number within the range between the minimum and maximum numbers in which the chordal deviation of any two sample points for is less than or equal to 0.1 millimeters, and in some embodiments, less than 0.5 millimeters. The actual number of sample points is used in the calculations to determine the trimline layout.

In block 264, the material side is selected. In block 265, the sheet metal thickness of the flange surface is input.

In block 266, a trimline is generated based on the input and selections of blocks 252 through 265. In at least one embodiment, the sheet metal bending model as described above is utilized to generate the trimlines. However, the generated trimline is projected onto the extension of a class one surface instead of the addendum surface.

It should be appreciated that a trimline can comprise a number of splines. In such instances, the splines can be optionally smoothed by linking the adjacent endpoints of a spline pair by tangency.

In block 268, the generated trimline is displayed. According to FIG. 7, trimlines 314, 316 and 318, corresponding to flange lines 308, 310 and 312, are displayed on an extension of the class one surface 302.

In block 270, the generated trimline can be saved in the CAD/CAM data file residing in non-volatile memory 24. Moreover, the input data and selections can also be saved to a file residing on non-volatile memory 24.

In at least one embodiment, the present invention includes the ability to detect and correct bad surface quality on a flange surface and/or an addendum or class one surface. Relatively small gaps can be fixed by connected the end points of the gap with a line. Relatively small overlaps can be fixed eliminating the overlap segment.

Figure 8:
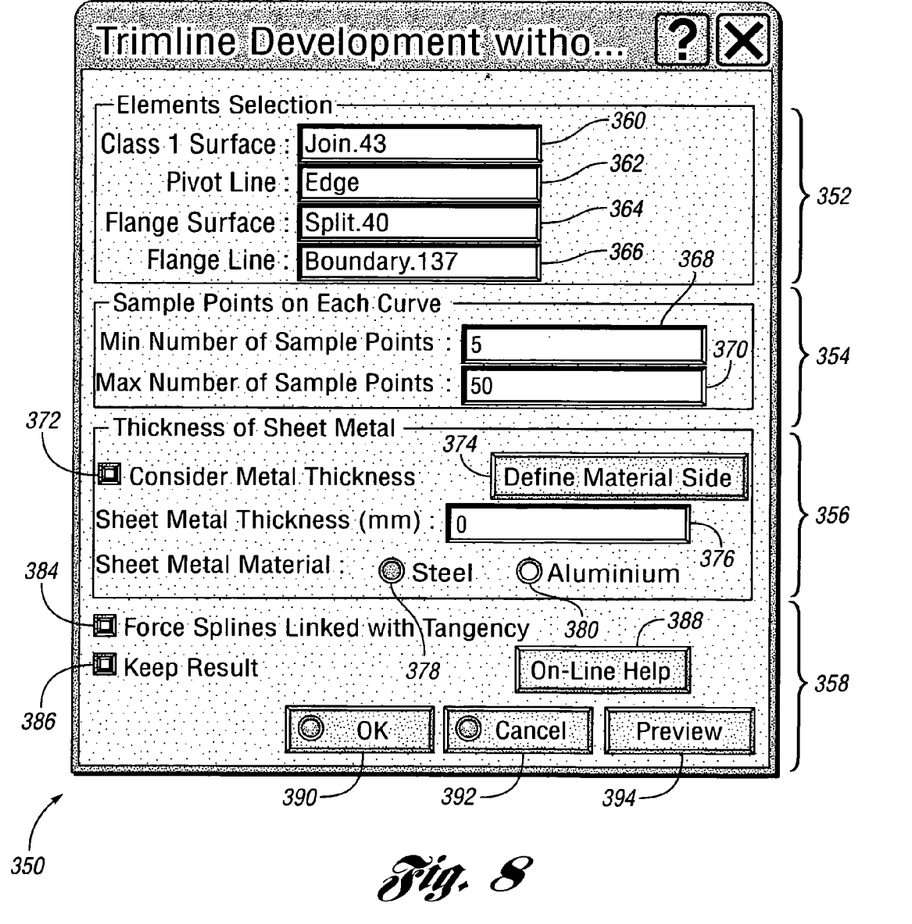
FIG. 8 is a graphical window for selecting geometry and inputting data for use in generating trimlines without an addendum surface for a part in accordance with one embodiment of the present invention.

FIG. 8 is a graphical window 350 for selecting geometry and inputting data for use in generating trimlines without an addendum surface for a part. Graphical window 350 includes elements selection area 352, sample points on each segment curve area 354, thickness of sheet metal area 356, and click boxes and buttons area 358. Elements selection area 352 includes class one surface field 360, pivot line field 362, flange surface 364 and flange line 366. In at least one embodiment, each of these elements can be selected by clicking on the appropriate geometry on the graphical representation of the part displayed through a GUI on display 14. The assigned name for the selected element then automatically appears in the element field. Sample points on each segment curve area 354 includes min number of sample points field 368 and max number of sample points field 370. The user can directly enter the values for these fields.

The thickness of sheet metal area 356 includes consider metal thickness toggle box 372 for toggling the option between on (checked) and off (unchecked) settings. If the box 372 is checked, the user can click on define material side click box 374 to define the material side through the graphical representation of the part. Moreover, the user can enter the sheet metal thickness in millimeters in field 376. The user can select the sheet metal material by toggling between the steel and aluminum radio buttons 378 and 380.

The click boxes and buttons area 358 includes force splines linked with tangency toggle box 382 for toggling the option between on (checked) and off (unchecked) settings. Area 358 also includes keep result toggle box 386 for toggling the option between on (checked) and off (unchecked) settings. Area 358 also includes on-line help button 388 for selecting on-line help menus. Area 358 includes OK button 390 for determining the trimline, displaying the results and closing window 350. Area 358 also includes cancel button 392 for undoing any trimline determination conducted and closing window 350. Area 350 also includes preview button 394 for determining the trimline, displaying the results and keeping window 350 active and open.

As required, detailed embodiments of the present invention have been disclosed herein. However, it is to be understood that the disclosed embodiments are merely exemplary of the invention that may be embodied in various and alternative forms. Therefore, specific functional details described herein are not to be interpreted as limiting, but merely as a representative basis for the claims and/or as a representative basis for teaching one of ordinary skill in the art to variously employ the present invention.

While the best mode for carrying out the invention has been described in detail, those familiar with the art to which this invention relates will recognize various alternative designs and embodiments for practicing the invention as defined by the following claims.

What is claimed is:

1. An electronic method for generating a trimline for trimming sheet metal to be stamped to obtain a stamped part, the method comprising:
   providing a CAD part file representing a part that can be stamped from a sheet metal material;
   receiving a selection of a part surface on the part to be stamped and a line on the surface;
   receiving an input of a sheet metal thickness for the sheet metal material; and
   generating a trimline based on the CAD part file, the line on the surface, and the sheet metal thickness.

2. The method of claim 1, further comprising:
   receiving the material side of the part; and
   wherein the generating step comprises:
      generating a trimline based on the CAD part file, the line on the surface, the sheet metal thickness and the material side.

3. The method of claim 2, wherein the generating step comprises:
   determining a neutral layer of sheet metal thickness based on the sheet metal thickness, the sheet metal material, and the material side;
   determining a neutral line based on the neutral layer of sheet metal thickness; and
   determining the trimline based on the length of the neutral line.

4. The method of claim 2, wherein the generating step comprises:
   determining an offset length of the sheet metal thickness based on sheet metal thickness, the sheet metal material, and the material side;
   determining a neutral line based on the offset length of sheet metal thickness; and
   determining the trimline based on the length of the neutral line.

5. The method of claim 4, wherein the offset length is ½ of the sheet metal thickness.

6. The method of claim 5, wherein the sheet metal material comprises steel.

7. The method of claim 1, wherein the part surface includes a flange.

8. The method of claim 7, wherein the line on the surface is a flange line.

9. The method of claim 8, wherein the flange line is selected from the group consisting of an edge of the flange surface, a boundary of a flange surface, an inner curve on a flange surface, and an inner hole on a flange surface.

10. The method of claim 8, further comprising:
receiving a minimum number of sample points for each segment curve of the flange line; and
receiving a maximum number of sample points for each segment curve of the flange line; and
determining an actual number of sample points for each segment curve of the flange line based on the minimum and maximum number of sample points.

11. The method of claim 10, wherein the generating step comprises:
generating the trimline based on the CAD part file, the line on the surface, the sheet metal thickness, and the actual number of sample points.

12. The method of claim 1, further comprising:
receiving the selection of an addendum surface and a pivot line, wherein the generating step comprises
generating a trimline based on the CAD part file, the line on the surface, the sheet metal thickness, the addendum surface, and the pivot line.

13. The method of claim 12, wherein the generating step further comprises forcing the trimline onto the addendum surface.

14. The method of claim 1, wherein the generating step further comprises forcing splines linked with tangency for the trimline if the trimline includes one or more splines.

15. The method of claim 1, further comprising:
receiving the selection of a class one surface and a pivot line, wherein the generating step comprises:
generating a trimline based on the CAD part file, the line on the surface, the sheet metal thickness, the class one surface and the pivot line.

16. The method of claim 1, further comprising:
displaying the generated trimline.

17. The method of claim 1, further comprising:
saving the generated trimline to non-volatile memory.

18. A computer system comprising:
a computer having a central processing unit (CPU) for executing machine instructions and a memory for storing machine instructions that are to be executed by the CPU, the machine instructions when executed by the CPU implement the following functions:
providing a CAD part file representing a part that can be stamped from a sheet metal material;
receiving a selection of a part surface on the part to be stamped and a line on the surface;
receiving an input of a sheet metal thickness for the sheet metal material; and
generating a trimline based on the CAD part file, the line on the surface, and the sheet metal thickness.

19. The system of claim 18, wherein the machine instructions when executed by the CPU further implement the following functions:
receiving the material side of the part; and
wherein the generating step comprises:
generating a trimline based on the CAD part file, the line on the surface, the sheet metal thickness and the material side.

20. An electronic method for generating a trimline for trimming sheet metal to be stamped to obtain a stamped part, the method comprising:
providing a CAD part file representing a part that can be stamped from a sheet metal material;
receiving a selection of a part surface on the part to be stamped and a line on the surface;
receiving an input of a sheet metal thickness and a material side for the sheet metal material;
determining a neutral layer of sheet metal thickness based on the sheet metal thickness, the sheet metal material, and the material side;
determining a neutral line based on the neutral layer of sheet metal thickness; and
determining the trimline based on the length of the neutral line.

* * * * *